Patented May 23, 1933

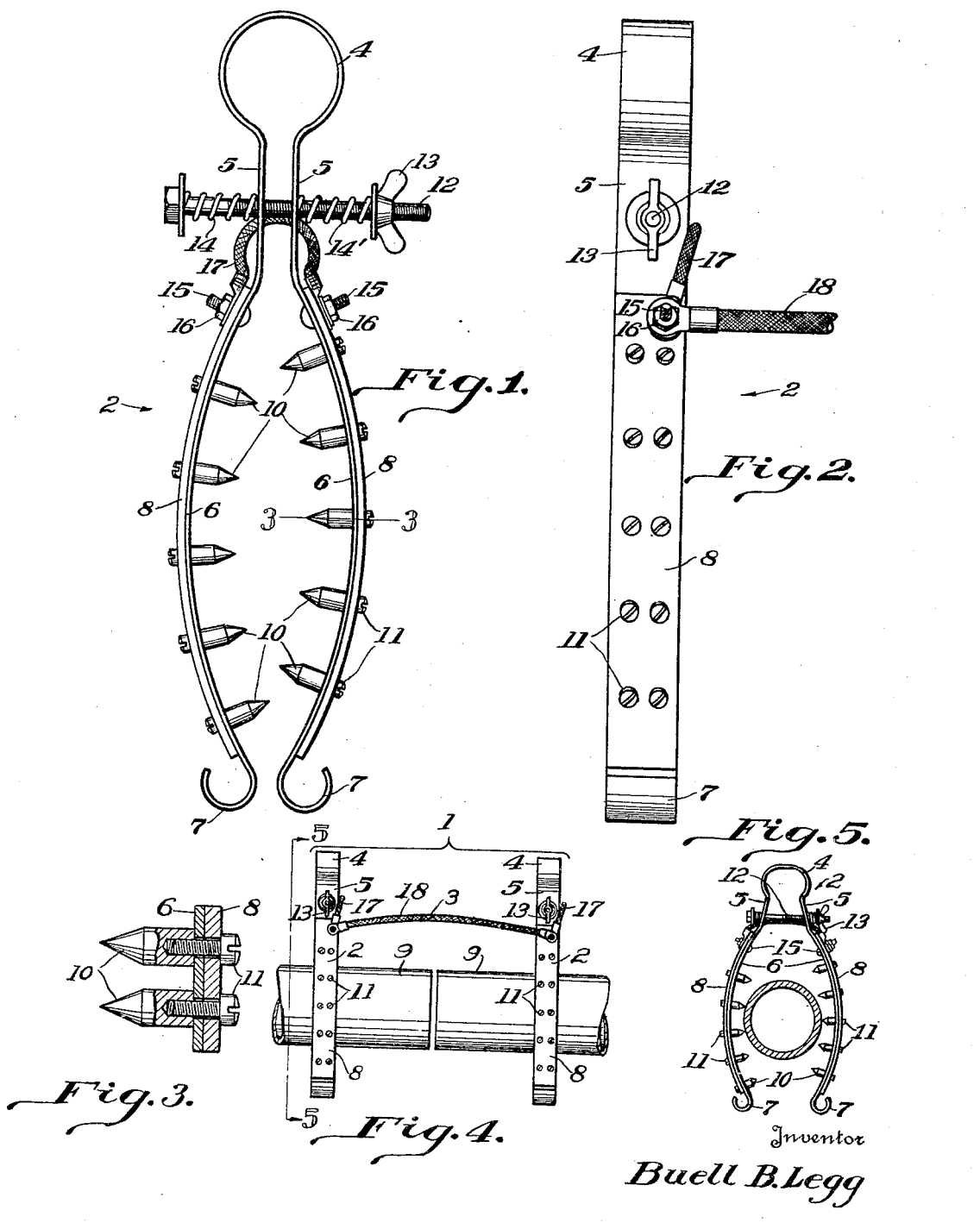

1,910,022

UNITED STATES PATENT OFFICE

BUELL B. LEGG, OF COLUMBUS, OHIO, ASSIGNOR TO COLUMBIA ENGINEERING AND MANAGEMENT CORPORATION, OF CINCINNATI, OHIO, A CORPORATION OF OHIO

BONDING CLAMP

Application filed May 22, 1931. Serial No. 539,330.

This invention relates to an improvement in safety bonding clamps which is adapted primarily for use by workmen in severing, disconnecting or otherwise coupling and uncoupling metallic pipes used in conducting inflammable fluids, to minimize the possibilities of accidents through explosions produced by stray electric currents passing through such pipes. It is therefore an outstanding object of the invention to provide a device which may be readily adapted to pipe lines without interfering with the workmen, when connecting or disconnecting such pipe lines where stray electric current may be present or suspected.

The longitudinal flow of stray electric current on pipe lines has long been recognized as one of the severest corroding agents that metallic pipe users face. Those dealing with the problem are aware that the combination of electricity and gas, using a common carrier such as a pipe line, has highly undesirable potentialities from a safety standpoint, and efforts are being made to educate those whose duties are directly concerned with the construction and repair of gas lines particularly in order to warn them of this little-known danger. When a pipe line or other continuous metallic structure having a current of appreciable value moving upon it is severed, the tendency is for a spark to be created between the separated parts. The intensity of this spark depends upon the current density of the conductor; the difference in voltage between the separated parts, and to an extent upon the condition of the severed ends, particularly where the structure is a gas pipe.

The workman's experience and the methods used in joining or cutting the pipe in the trench will be contributing factors and may tend to increase or decrease the attendant risk. It follows that an inexperienced crew, finding it necessary to "fumble" a joint in removing it, increase the risk by make and break contacts which such an operation invites in the event current is present, causing, quite frequently, the generation of a number of sparks, any or all of which may be sufficient to ignite leaking gas.

In communities having electric railway service, the danger is more acute if a pipe line, having screw, weld, or other metal to metal joints, is the structure under construction, due to the smaller electrical resistance of joints of this type, and the consequent easier path offered the flow of current. Nor are the transmission and production lines far removed from electric railway tracks exempt from the flow of stray current. Transmission lines, other than those having certain types of rubber ring couplings, due to their size and length, often collect from the earth and conduct relatively a large amount of stray current, and because of their remoteness from trolley operations are apt to give a repair crew a false sense of security. Particularly is this true in localities where coal mines are operating small electric mine cars and other equipment. There the source of current is even less apparent and quite frequently affects wells, production lines and transmission lines over a large area.

With this safety factor in mind, I have produced a quickly attachable and removable device which may be applied to a pipe line, adjacent to a point where it is to be connected or disconnected, for the purpose of providing a small resistance path for any current flowing on the pipe line, allowing such current to be shunted around the separated pipe ends. I am aware of the fact that it has been proposed heretofore to accomplish this result but my present bonding clamp is intended to supplant and to improve upon such earlier and mechanically more cumbersome appliances or methods, such as the compression screw tool, or the practice of filing or abrading the pipe and wrapping wire around a clean portion, all of which are highly unsatisfactory.

It is another object of the invention to provide a bonding clamp for the purpose set forth constructed of a highly resilient metal, such as saw steel and provided with spaced resilient jaws, which carry opposed inserts having machined pipe engaging points, and in addition to provision being made for tightening the jaws of the clamp around the pipe, whereby the points engage with the pipe surfaces to secure a good electrical contact therewith, irrespective of coatings on the pipe, the clamp being further provided with adjustable screw means for positively forcing the points into the pipe independent in addition to the normal resiliency of the jaws.

It is another object of the invention to provide a bonding clamp appliance consisting of a pair of such clamps, which are applied at the ends of a pair of adjoining pipes and are connected by a flexible electrical conductor, whereby when the pipe ends are separated, or when a single length of pipe is severed, such disconnection provides for the passage of all stray currents through the bonding appliance to eliminate the presence of such stray current in the region of pipe disconnection.

It is a further object of the invention to provide a bonding appliance of this character wherein the individual clamp members are of such form that they may be readily adapted to pipes possessing widely differing diameters.

An additional object resides in constructing each of the clamp members so that while they possess sufficient metallic strength to enable them to readily hold up under the severe usage due to field operations, yet at the same time, they will possess the capabilities of good electrical conductors.

With these and other objects in view, which which appear as the description proceeds, the invention consists in the novel features of construction, combination of elements and arrangements of parts hereinafter fully described and pointed out in the appended claims.

In the accompanying drawing:

Fig. 1 is a view in end elevation of one of the clamp members employed in my improved bonding appliance;

Fig. 2 is a side elevation of said clamp member;

Fig. 3 is a horizontal sectional view on the plane indicated by the line 3—3 of Fig. 1;

Fig. 4 is a side elevation disclosing a pair of clamping members, comprising the complete bonding appliance, mounted on a pair of adjoining pipe ends and disclosing the position of the bonding appliance in practice;

Fig. 5 is a transverse sectional view on the line 5—5 of Fig. 4.

Referring more particularly to the drawing, the numeral 1 designates my improved bonding appliance in its entirety. In its preferred embodiment, this appliance consists of a pair of spaced clamping members 2—2 which are united by one or more flexible electrical conductors 3.

Each of the clamping members is formed to comprise a spring steel strip formed centrally of its length to produce a circular eye portion 4 which terminates in spaced downwardly extending side walls 5, and the latter, in turn, terminate in outwardly bowed resilient jaws 6—6 of desired curvilineal form, the lower ends of said jaws terminating in rounded extremities 7, which permit of the ready application of the clamp to a pipe. The clamps are preferably formed from a steel, such as saw steel, in order that they will possess inherently a desired degree of resiliency.

To improve the current conducting properties of the clamp, I apply to the outer surfaces of each of the jaws 6 arcuate copper plates designated by the numeral 8. These plates possess a slightly greater curvature than that normally imparted to the jaws 6. To insure a good electrical contact between the jaws and a pair of separable pipe ends, indicated at 9—9, I provide the interior of the jaws with a plurality of inwardly directed steel pins 10, which are provided with sharp, penetrating machine points, which are adapted to pass through coatings, if present, on the pipe ends, so that the points will penetrate into the metal structure of the pipes, to which the clamps are attached, to secure proper mechanical and electrical contact. The larger ends of the pins are provided, as shown in Fig. 3, with threaded bores which are adapted for the reception of headed fastening screws 11, and these screws when tightened serve to hold the pins 10 and the copper plates 8 in rigid secured relationship with the jaws 6, insuring good contact between the screw heads and the copper plates and in addition, forming a lock for the screws by the relative differences in curvature of the jaws 6 and the plates 8.

To further procure the desired contact between the pointed ends of the pins 10 and the pipes 9, in addition to the pressures supplied to the normal resiliency of the jaws 6 and the associated eye portion 4, the walls 5 of the clamp members are formed with registering openings through which passes a tightening screw 12. The threaded end of this screw is provided with a wing nut or its equivalent 13. The headed end of the screw is provided with a washer and positioned between this washer and the adjoining wall 5 and surrounding the screw 12 is a coil spring 14. Likewise, engaging with the wing nut 13 and positioned on the screw 12 is a washer, and located between this washer and the adjoining side wall 5, and surrounding the screw 12 is a complementary spring 14'. In practice, the wing nut 13 is moved outwardly on the screw 12 to a desired extent and the jaws 6 are separated so that each clamping member may be applied around the pipes 9, as shown in Figs. 4 and 5, with the pointed ends of the pins 10 in contact with said pipe members. Then, by tightening the nut 13, additional pressures are created which serve to draw the jaws 6 inwardly so that the pins 10 will be more positively brought into penetrating engagement with the pipe walls. Headed screws 15 pass through the upper ends of the jaws 6 and the plates 8 and have their outer portions provided with binding nuts 16. These fastening elements are used to secure a current conductor 17 in connection with the upper ends of the plates 8 of each clamp and also provide a fastening for securing the terminal portions of a flexible conductor 18 through which current passes from one clamp to the other. This forms a low resistance shunt circuit for the pipe current, which under ordinary circumstances, is sufficient to reduce the difference in potential between the separated structures and prevent to a large extent the tendency for a spark to be formed at any point on the structure spanned by the two clamps. The clamps, being primarily self adjusting, are easily placed on a pipe, spanning the pipe where a cut is to be made or where a connection is to be completed, and each clamp is rocked back and forth slightly in order to allow the hardened steel contact points on the pins 10 to penetrate any high resistance coating covering the metal.

The facility with which these clamps, which may be of any size, may be applied to pipe members, their light weight and ease of transporting recommends their use by field crews for the purpose of reducing risks that have heretofore resulted in serious accidents involving personal injury and property damage.

What is claimed is:

1. In a bonding appliance, a clamp formed to comprise a pair of bowed relatively separable resilient jaws shaped to surround a pipe member, arcuate conductor plates connected with said jaws, inwardly projecting pointed pins protruding from the inner surfaces of said jaws to engage with the pipe member, fastening devices for securing said conductor plates and pins to said jaws, a flexible conductor uniting said plates, and manually adjustable threaded means for positively drawing said jaws and pins into clamping engagement with the pipe member.

2. A bonding clamp of the character described, comprising a flat metallic strip bent longitudinally and centrally upon itself to form a loop which terminates in a pair of spaced arcuate resilient jaws shaped to surround a pipe member, arcuate conductor plates carried by said jaws, inwardly projecting pointed pins protruding from the inner surfaces of said jaws to engage with the pipe member, removable fastening devices for securing said conductor plates and pins to said jaws, a flexible conductor uniting said plates, a second conductor connected with at least one of said jaws, and manually adjustable threaded means for drawing said jaws and pins into clamping engagement with the pipe member.

3. A bonding clamp of the charatcer described, comprising a flat comparatively thin metallic strip bent longitudinally and centrally upon itself to form a loop which terminates in a pair of spaced arcuate resilient jaws shaped to surround a pipe member, arcuate conductor plates carried by the outer surfaces of said jaws, inwardly projecting pointed pins protruding from the inner surfaces of said jaws to engage with the pipe member, threaded fastening devices for securing said conductor plates and pins to said jaws, a flexible conductor uniting said plates, a second conductor connected with at least one of said jaws, a bolt passing through said jaw members at a point adjacent said loop, a spring on said bolt, and manually adjustable threaded means for applying tension to said spring and jaw members when in a clamping position upon the pipe member.

In testimony whereof I affix my signature.

BUELL B. LEGG.